United States Patent
Sempere-Belda et al.

(10) Patent No.: US 9,527,756 B2
(45) Date of Patent: Dec. 27, 2016

(54) PROCESS FOR REMOVAL OF RADIOACTIVE CONTAMINATION FROM WASTEWATER

(71) Applicant: AREVA GMBH, Erlangen (DE)

(72) Inventors: Luis Sempere-Belda, Erlangen (DE); Rainer Gassen, Fuerth (DE); Bertram Zeiler, Bischberg (DE); Jose Pedro Moreira Do Amaral, Fuerth (DE)

(73) Assignee: Areva GmbH, Erlangen (DE)

( * ) Notice: Subject to any disclaimer, the term of this patent is extended or adjusted under 35 U.S.C. 154(b) by 229 days.

(21) Appl. No.: 14/492,265

(22) Filed: Sep. 22, 2014

(65) Prior Publication Data

US 2015/0008186 A1    Jan. 8, 2015

Related U.S. Application Data

(63) Continuation of application No. PCT/EP2013/055779, filed on Mar. 20, 2013.

(30) Foreign Application Priority Data

Mar. 20, 2012 (DE) .................. 10 2012 204 415

(51) Int. Cl.
| | | |
|---|---|---|
| *C02F 1/42* | (2006.01) | |
| *C02F 1/52* | (2006.01) | |
| *C02F 1/28* | (2006.01) | |
| *C02F 1/70* | (2006.01) | |
| *C02F 1/72* | (2006.01) | |
| *G21F 9/12* | (2006.01) | |
| *C02F 101/00* | (2006.01) | |

(52) U.S. Cl.
CPC . *C02F 1/42* (2013.01); *C02F 1/28* (2013.01); *C02F 1/281* (2013.01); *C02F 1/52* (2013.01); *C02F 1/5236* (2013.01); *C02F 1/5272* (2013.01); *C02F 1/70* (2013.01); *C02F 1/72* (2013.01); *C02F 2101/006* (2013.01); *C02F 2305/02* (2013.01); *C02F 2305/023* (2013.01); *G21F 9/12* (2013.01)

(58) Field of Classification Search
CPC .............. C02F 1/28; C02F 1/281; C02F 1/52; C02F 1/70; C02F 1/72; C02F 1/5236; C02F 1/5272; C02F 1/42; C02F 2305/02; C02F 2305/023; C02F 2101/006; G21F 9/12

USPC ......................................................... 210/682
See application file for complete search history.

(56) References Cited

U.S. PATENT DOCUMENTS

| | | | |
|---|---|---|---|
| 3,013,978 A | 12/1961 | Rosinski | |
| 3,873,362 A | 3/1975 | Mihram et al. | |
| 4,269,706 A | 5/1981 | Sondermann | |
| 4,377,508 A | 3/1983 | Rothberg | |
| 4,902,665 A | 2/1990 | Elfline | |
| 5,523,513 A | 6/1996 | Milner | |
| 5,728,302 A * | 3/1998 | Connor | B09C 1/002 |
| | | | 210/679 |
| 6,521,809 B1 | 2/2003 | Smith et al. | |
| 7,772,451 B2 * | 8/2010 | Enda | G21F 9/28 |
| | | | 210/688 |
| 2009/0159532 A1 | 6/2009 | Kelly et al. | |

FOREIGN PATENT DOCUMENTS

| | | |
|---|---|---|
| CA | 1154885 A1 | 10/1983 |
| CN | 1087878 A | 6/1994 |
| CN | 1106472 A | 8/1995 |
| DE | 2724954 A1 | 12/1978 |
| DE | 3007716 A1 | 9/1981 |
| DE | 3321069 A1 | 12/1983 |
| DE | 69507709 T2 | 12/1999 |
| DE | 69812686 T2 | 2/2004 |
| EP | 0240985 A1 | 10/1987 |
| GB | 2005655 A | 4/1979 |
| GB | 2123203 A | 1/1984 |
| JP | 04086599 A | 3/1992 |
| JP | 2005241387 A | 9/2005 |
| RU | 2250521 C2 | 4/2005 |
| WO | 2005024847 A1 | 3/2005 |

* cited by examiner

*Primary Examiner* — Matthew O Savage
(74) *Attorney, Agent, or Firm* — Laurence A. Greenberg; Werner H. Stemer; Ralph E. Locher

(57) ABSTRACT

A process removes radioactive contamination from wastewater obtained in the decontamination of a cooling circuit of nuclear reactors or of parts thereof or in the course of operation of a nuclear reactor. A $MnO_2$ precipitate is exclusively produced in the wastewater with the aid of permanganate ions added thereto as an oxidizing agent and of one or more organic reducing agents present in and/or metered into the wastewater, and the $MnO_2$ precipitate is separated from the wastewater.

12 Claims, No Drawings

PROCESS FOR REMOVAL OF RADIOACTIVE CONTAMINATION FROM WASTEWATER

CROSS-REFERENCE TO RELATED APPLICATION

This is a continuation application, under 35 U.S.C. §120, of copending international application No. PCT/EP2013/055779, filed Mar. 20, 2013, which designated the United States; this application also claims the priority, under 35 U.S.C. §119, of German patent application No. 10 2012 204 415.9, filed Mar. 20, 2012; the prior applications are herewith incorporated by reference in their entireties.

BACKGROUND OF THE INVENTION

Field of the Invention

The invention relates to a process for the removal of radioactive contaminants from wastewaters which first are obtained in the decontamination of the cooling circuit of nuclear reactors or parts thereof, and second in the course of operation of a nuclear reactor. In the reactor coolant, there are frequently situated radioactive substances not only in dissolved form, but also in colloidal or particulate form. In the decontamination, oxide layers present on the surfaces of cooling circuit components containing metals are detached, wherein inorganic and/or organic acids are used which form water-soluble complexes with metal ions from the oxide layer, for example iron(II) or iron(III) ions. In the course of the decontamination, the decontamination solution becomes enriched with complex-dissolved metal cations and also anions. At the latest at the end of the decontamination, the oxide layer components that have passed into solution, also including radio nuclides, are removed, by conducting the wastewater or the decontamination solution over ion exchangers. Any organic substances still present in the wastewater, for example, an unconsumed residue of a decontamination acid such as oxalic acid, can optionally be broken down to carbon dioxide and water, for example by an oxidation treatment with irradiation by UV light.

The wastewater present at the end of decontamination is therefore relatively pure from the chemical aspect. However, despite the ion-exchanger treatment, radioactive contaminants are still frequently present, in such a manner that delivery of the wastewater into the surroundings is impossible. The same applies to reactor coolant which is inherently radioactively contaminated. A wastewater of this type is therefore, if it is to be delivered to the surroundings, or is to be reused in purified form, for example, is usually subjected to evaporation. The vapor phase or the condensate produced therefrom by cooling is virtually free from radioactivity. In the decontamination of a coolant circuit, some tons of wastewater are obtained, and so the expenditure in terms of time and energy for the evaporation are considerable, and give rise to corresponding costs. The solidification and final storage of the evaporation residue are also associated with high costs.

SUMMARY OF THE INVENTION

It is the object of the invention to specify a process of the type specified at the outset which can be carried out more simply and with lower expenditure in terms of time, energy and costs.

The object is achieved by a process in which an $MnO_2$ precipitate is exclusively produced in the wastewater using permanganate ions added thereto as an oxidizing agent and one or more reducing agents present in the wastewater and/or added thereto from the group of organic reducing agents and reducing agents oxidizable to water, wherein the $MnO_2$ precipitate is separated off from the wastewater. In this process it is first advantageous that, apart from the oxidizing agent and the reducing agent, no further additives such as salts, acids or bases are necessary, which would increase the mass of $MnO_2$ precipitate, which is the amount of waste that is to be disposed of.

In the formation and sedimentation of the $MnO_2$ precipitate, the precipitate then, as has surprisingly been found itself further binds radioactivity if it is present only in very low concentration in the wastewater, which is the case with wastewaters produced in the course of operation and with used decontamination solutions. The radioactive contaminants are removed from the wastewater together with the precipitate. The activity values of the wastewater can be lowered in this manner to the extent that disposal into the environment or reuse, for example, in the nuclear power plant, is quite safe. The radioactivity of the wastewater is due, for example, to colloidally dissolved, alpha-nuclides such as Am-241 or else gamma-nuclides such as particles containing Co-60 having a size in the nanometer range, which were not retained during the purification of the wastewater in the course of decontamination of the cooling circuit using ion exchangers. As carriers of the radioactivity, however, dissolved nuclide-cations also come into consideration. The colloidally dissolved particles are thought to be bound by adsorption to the precipitates, which should also apply to ions and/or included in cavities of the precipitates.

It is advantageous for the purification effect in question if those reaction partners are selected which result in precipitates that are as voluminous as possible, which is the case to a particularly pronounced extent in the case of manganese dioxide ($MnO_2$) precipitates. In the reaction with a reducing agent of the type in question, the manganese, which is present in the permanganate ion in the oxidation state +VII is converted to the oxidation state +IV, wherein the poorly soluble manganese dioxide forms. This forms fluffy loose ion aggregates interspersed by water-filled cavities, which can bind colloidally dissolved particles and also ions particularly well.

A further feature essential to the invention is that $MnO_2$ precipitates are produced exclusively. This is achieved by, in the wastewater to be treated, apart from the at least one organic substance acting as reducing agent, or a reducing agent oxidizable to water, no agents being present or being added which form a precipitate with Mn-IV and as a result would increase the amount of radioactive precipitate that is to be deposited or disposed of. In the oxidation using permanganate ions, organic reducing agents are decomposed to form carbon dioxide and water, while only water is formed from the other reducing agents mentioned.

The use of an organic reducing agent is particularly advantageous in the process according to the invention, because this gives the possibility that it is either oxidized to give organic fragments which can be further broken down by carrying out the precipitation, for example, using UV radiation, or is oxidized directly to carbon dioxide and water. The organic reducing agent added to the wastewater therefore does not increase the amount of the precipitate, which otherwise would lead to an increased expenditure in the solidification and disposal of the precipitate.

With respect to reduction of the waste that is to be disposed of, that is the amount of solids which remain over after separation thereof from the liquid phase, it is advantageous if a salt of permanganic acid such as $KMnO_4$ is not used as the oxidizing agent, but rather permanganic acid ($HMnO_4$) is used. As a result, because of the absence of potassium ions, the amount of waste is further reduced. In addition, removal of dissolved potassium ions from the wastewater by ion exchange is not necessary.

In the purification of a used decontamination solution, preferably, as a reducing agent, compounds are used which are also used, or are usable, that is to say are permitted, in the decontamination of the cooling circuit. This procedure achieves the advantage that, with respect to disposal of the precipitates separated off from the wastewater, no additional qualification measures, for example material compatibility studies, are necessary, since wastes containing these substances are also produced in the course of the decontamination. Examples of such organic reducing agents are oxalic acid and formic acid. These are reduced by permanganates and permanganic acid to carbon dioxide and water. A further reducing agent, for which the abovementioned advantage applies, is, e.g., hydrogen peroxide.

In a further preferred process variant, the compounds reacting with one another, that is to say permanganate ions and an organic reducing agent, are added in stoichiometric amounts, i.e. in each case sufficient that, in the reaction, the amounts added are completely, or at least virtually completely, consumed. Therefore, the wastewater contains virtually no excess which could impede further use of the wastewater. In order to affect the properties of the manganese dioxide flakes formed, it can be advantageous to use the reducing agent in a slight excess compared with the oxidizing agent. The precipitates formed in this case have larger flakes and as a result are easier to filter.

To form the precipitate, it is uncritical in what sequence the compounds required to form a precipitate are added to the wastewater. Joint or simultaneous addition is also conceivable. The amount of reagents provided for the precipitation can equally be added in one or more batches. However, it can be advantageous to add the permanganate ions, that is to say, e.g. permanganic acid, to the wastewater already containing the reducing agent. It has been found in this procedure that an otherwise observable adhesion of manganese dioxide to the walls of the container in which the precipitation is carried out is substantially suppressed. The manganese dioxide flakes formed in the precipitation chiefly remain in suspension, which facilitates the later separation thereof from the wastewater. In the case of a wastewater obtained in the course of decontamination, frequently a residue of unconsumed decontamination acid is still present. In such a case, it is expedient to exploit this residue as a reducing agent and thus to reduce the requirement of chemicals for the $MnO_2$ precipitation.

In the case of a used decontamination solution obtained in the course of the decontamination of the cooling circuit of a nuclear reactor, it is expedient to exploit a residue of an organic substance, for example a decontamination acid such as oxalic acid, present in the solution as a reducing agent for the $MnO_2$ precipitation.

A particularly preferred process variant provides that the wastewater is agitated for at least one hour, but better 5 to 30 hours, e.g. by stirring, in order to prevent sedimentation of the precipitate, that is to say to keep the precipitate in suspension in the wastewater. This measure has the effect that the particles of the precipitate aggregate to form relatively large structures, which facilitates the separation of the precipitate, in particular by filtration. In addition, the purification effectiveness is increased thereby, in particular with respect to, e.g., colloidally dissolved nuclide particles, since they, on account of their substantially uncharged character, bind less readily to the precipitate than is the case with ionic contaminants.

The precipitates that form via one of the process variants described are preferably separated off from the wastewater by filtration. Other methods of separating off, for example centrifugation, are also conceivable, however. After the separation, the precipitate is dried in order to decrease the mass that is to be disposed of.

Other features which are considered as characteristic for the invention are set forth in the appended claims.

Although the invention is described herein as embodied in a process for removal of radioactive contamination from wastewater, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE INVENTION

In the table hereinafter, the result of an experiment is reproduced, in which the radioactivity of a wastewater sample (500 ml) is decreased using a precipitate generated by a RedOx reaction. The wastewater sample originates from a decontamination solution with which a steam generator of a pressurized water reactor was decontaminated on the primary side. The decontamination solution had already been purified on the power plant side using ion exchangers. Nevertheless, a purification with a laboratory mixed-bed ion exchanger was performed a further time, in order to test how far a decrease in activity, especially considering the alpha activity, is possible under clean laboratory conditions. The corresponding activity values based on individual alpha nuclides may be found in the table hereinafter.

The precipitation was performed at a wastewater temperature of 25° C. using permanganic acid and oxalic acid in stoichiometric amounts, wherein, after addition of the reagents, the sample was stirred for 20 hours and the $MnO_2$ precipitate was kept in suspension in the wastewater in the course of this process. Thereafter, the precipitate was filtered off.

|  | Initial sample | After ion exchange | After $MnO_2$ precipitation |
|---|---|---|---|
| Total α-activity | 3.23E+05 Bq | 3.21E+05 Bq | 3.39E+03 Bq |

Whereas using the ion exchange performed in the laboratory only a slight decrease in activity could be achieved, the precipitation step showed a marked reduction of the total activity by about the factor 100, even with a single treatment step. The treatment can, if necessary, be repeated several times, until the desired degree of purification is achieved.

The amounts of reagents added to the wastewater for precipitation depends quite generally on what amount of precipitate is to be produced. In the case of permanganic acid or potassium permanganate, the required amount is in the range from 10 mg/l to 50 g/l, wherein, however, a range of 100 mg/l to 1,000 mg/l can usually be employed. In the present experiment, 160 mg of permanganic acid and 255 mg of oxalic acid dihydrate were added, more precisely in two batches each having half of the amount stated. The precipitation procedure is generally possible not only at room temperature (25° C.), but also at elevated temperatures up to 100° C., if such a temperature is necessary for the respective reaction.

The invention claimed is:

1. A process for removal of radioactive contaminants from wastewater obtained in a decontamination of a cooling circuit of nuclear reactors or parts thereof or in a course of operation of a nuclear reactor, which comprises the steps of:
    conducting the wastewater containing the radioactive contaminants first over ion exchangers for removal of metal ions being part of the radioactive contaminants and present in the wastewater;
    subsequently exclusively producing an $MnO_2$ precipitate by adding only an oxidizing agent to the wastewater and a presence of a reducing agent in the wastewater and therefore no further additives are added or present which are not oxidizing agents, reducing agents or parts thereof, the $MnO_2$ precipitate binding to remaining components of the radioactive contaminates, wherein adding permanganic acid as the oxidizing agent and the reducing agent present in the wastewater and/or added to the wastewater being selected from the group consisting of organic reducing agents and reducing agents oxidizable to water; and
    separating off the $MnO_2$ precipitate with the radioactive contaminates from the wastewater.

2. The process according to claim 1, wherein the reducing agent is selected from a group of compounds also used in decontamination of the cooling circuit.

3. The process according to claim 1, wherein an oxalic acid and/or a formic acid is used as the reducing agent.

4. The process according to claim 1, wherein the reducing agent oxidized exclusively to water is added to the wastewater.

5. The process according to claim 4, which further comprises adding hydrogen peroxide to the wastewater.

6. The process according to claim 1, which further comprises adding the permanganic acid and an organic reducing agent in stoichiometric amounts.

7. The process according to claim 1, which further comprises adding the reducing agent in an excess over the oxidizing agent.

8. The process according to claim 1, which further comprises agitating the wastewater for holding the $MnO_2$ precipitate in suspension.

9. The process according to claim 8, which further comprises holding the $MnO_2$ precipitate for at least one hour in suspension in the wastewater.

10. The process according to claim 9, which further comprises holding the $MnO_2$ precipitate for 5 hours to 30 hours in suspension.

11. The process according to claim 1, which further comprises separating off the $MnO_2$ precipitate from the wastewater by filtration and/or centrifugation.

12. The process according to claim 11, which further comprises drying off the $MnO_2$ precipitate that is separated.

* * * * *